United States Patent [19]
Beatenbough

[11] 3,738,120
[45] June 12, 1973

[54] AUTOMOTIVE REFRIGERANT SYSTEM
[75] Inventor: Paul K. Beatenbough, Medina, N.Y.
[73] Assignee: General Motors Corporation, Detroit, Mich.
[22] Filed: Feb. 17, 1972
[21] Appl. No.: 227,029

[52] U.S. Cl. .................................. 62/229, 62/244
[51] Int. Cl. ............................................ F25b 1/00
[58] Field of Search .................. 62/227, 229, 243, 62/244, 323, 413, 414

[56] References Cited
UNITED STATES PATENTS
2,986,018  5/1961  Algren et al. .......................... 62/227
3,088,290  5/1963  Zearfoss, Jr. ...................... 62/414 X
3,686,892  8/1972  Bassett, Jr. ............................ 62/323

Primary Examiner—William F. O'Dea
Assistant Examiner—Ronald C. Capossela
Attorney—W. S. Pettigrew, J. C. Evans and K. H. MacLean Jr.

[57] ABSTRACT

An automobile heating and air conditioning system having a refrigerant compressor rotated by an automobile engine through an electromagnetic clutch which is controlled by an ambient temperature switch and an air outlet temperature switch downstream from the evaporator. The switches are connected in parallel between the automobile battery and the electromagnetic clutch to independently energize the clutch and initiate operation of the compressor. The ambient switch is set to close at about 65° F. while the air discharge switch closes at about 32° F. This causes the air conditioning system to be inoperative when the ambient temperature is below 32° F. and to run continuously when the ambient temperature is above 65° F. The compressor cycles off and on when the ambient temperature is between 32° F. and 65° F. to prevent frost accumulation on the evaporator.

3 Claims, 4 Drawing Figures

| AMBIENT DBT | AMBIENT SW. CLOSED > 6.5 DBT OPEN < 65 DBT | EVAP., REFRIG., OR AIR DISCHARGE SW. CLOSED > 32 DBT OPEN < 32 DBT | REFRIGERANT CONTROL |
|---|---|---|---|
| < 32 | OPEN | OPEN | INOPERATIVE |
| 32 to 65 | OPEN; ENABLES EVAP. SWITCH CLOSED | CYCLE FOR FREEZE PROTECT. OVERRIDDEN BY AMBIENT SW. | OPERATES ON CYCLE CONTROLS AT SAT. PR. FOR 32°F FIN. TEMP. |
| > 65 | | | |

AUTOMOTIVE REFRIGERANT SYSTEM

This invention relates to automobile air conditioning systems and to automatic controls to prevent evaporator freezing.

The present automobile air conditioning system is operative whenever the ambient temperature is above 32° F. Below a temperature of 32° F., water vapor in the air will readily freeze on the evaporator which will block air flow. Between about 32° F. and about 65° F., the heat load upon the evaporator may be insufficient to fully vaporize refrigerant so as to maintain evaporator pressure and temperature above freezing levels. Therefore, the automatic controls do not operate the compressor continuously within this temperature range. Some means must be provided to maintain the evaporator temperature and pressure above a predetermined freezing level. Previously, a flow restricting suction throttling valve between the evaporator and the compressor inlet has been used to restrict refrigerant flow from the evaporator and thus maintain its refrigerant pressure above a freezing level.

In the present automatically controlled air conditioning system, an air discharge temperature switch downstream from the evaporator closes when the temperature of the air discharged from the evaporator exceeds about 32° F. Conversely, the switch will open when the air temperature falls below 32° F. The compressor operates as long as the air discharge temperature is above 32° F. The compressor is deactivated when the air discharge temperature falls below 32° F. corresponding to potential freezing of the evaporator. The switch will close again and activate the compressor when the air discharge temperature exceeds about 32° F. The cycled operation of the compressor prevents the evaporator temperature from falling below 32° F. and thus prevents frost accumulation.

It has been determined that at ambient temperatures above about 65° F., the compressor may be operated continuously without freezing because the heat load produced by the air flowing through the evaporator is great enough to prevent frost accumulation. An ambient temperature sensing switch in the electromagnetic clutch circuit of the compressor activates the compressor whenever the ambient temperature exceeds about 65° F. This ambient switch is connected in parallel with the other switch and thus acts independently of the other switch in controlling the electromagnetic clutch and the compressor.

Therefore, an object of the invention is to provide automatic controls for an automobile air conditioning system which prevent frost accumulation on the evaporator by cycling the compressor off and on in response to the temperature of the air discharged from the evaporator which oscillates below and above about 32° F. as sensed by a thermally responsive switch in the air stream from the evaporator.

A further object of the invention is to provide automatic controls for an air conditioning system which cycles the compressor on and off when the ambient temperatures fall in a range of about 32° F. to 65° F. and which continuously operates the compressor when the ambient temperature is above about 65° F.

A still further object of the invention is to provide automatic controls for an air conditioning system in which a compressor with an electromagnetic clutch is cycled off and on by an air temperature sensing switch placed in the air discharge from the evaporator which operates to control the compressor within a range of ambient temperatures of about 32° F. to about 65° F. and in which the compressor is operated continuously at ambient temperatures exceeding about 65° F. by an ambient temperature sensing switch which acts independently of the other switch.

Further objects and advantages of the present invention will be readily apparent from the following detailed description of the invention, reference being had to the accompanying drawings in which a preferred embodiment is clearly shown.

IN THE DRAWINGS

Figure 1:
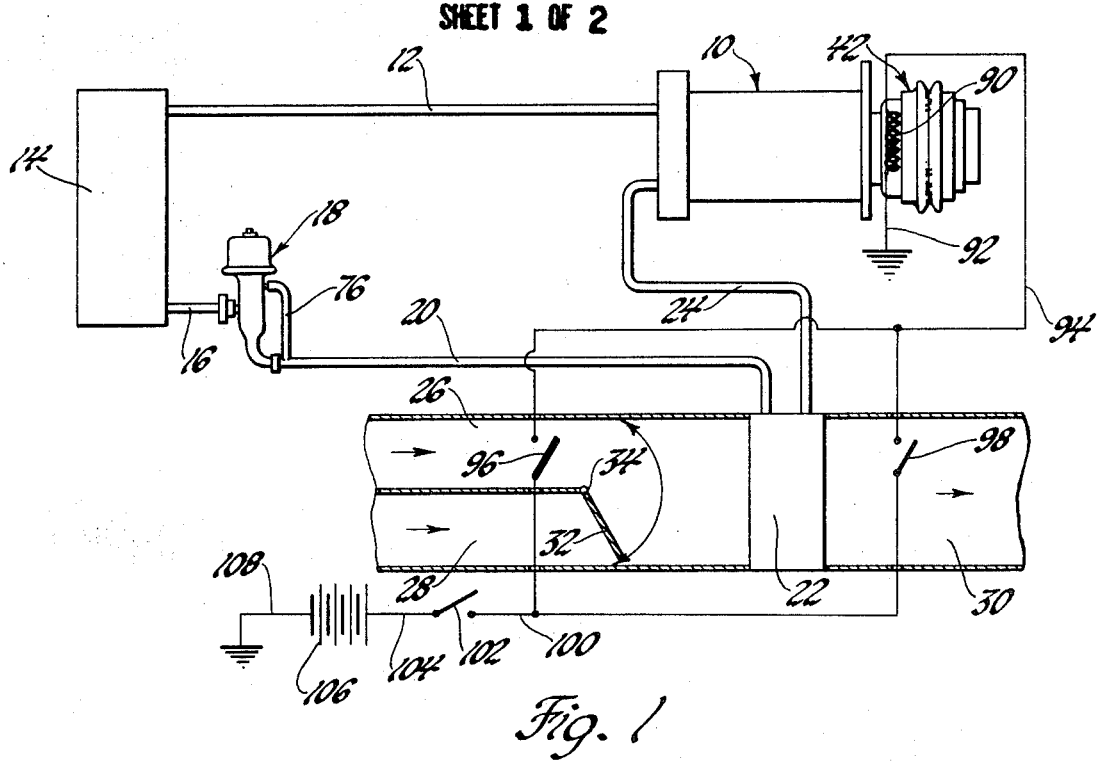
FIG. 1 is a somewhat schematic view of an automobile air conditioning system utilizing the present invention.
Figure 2:
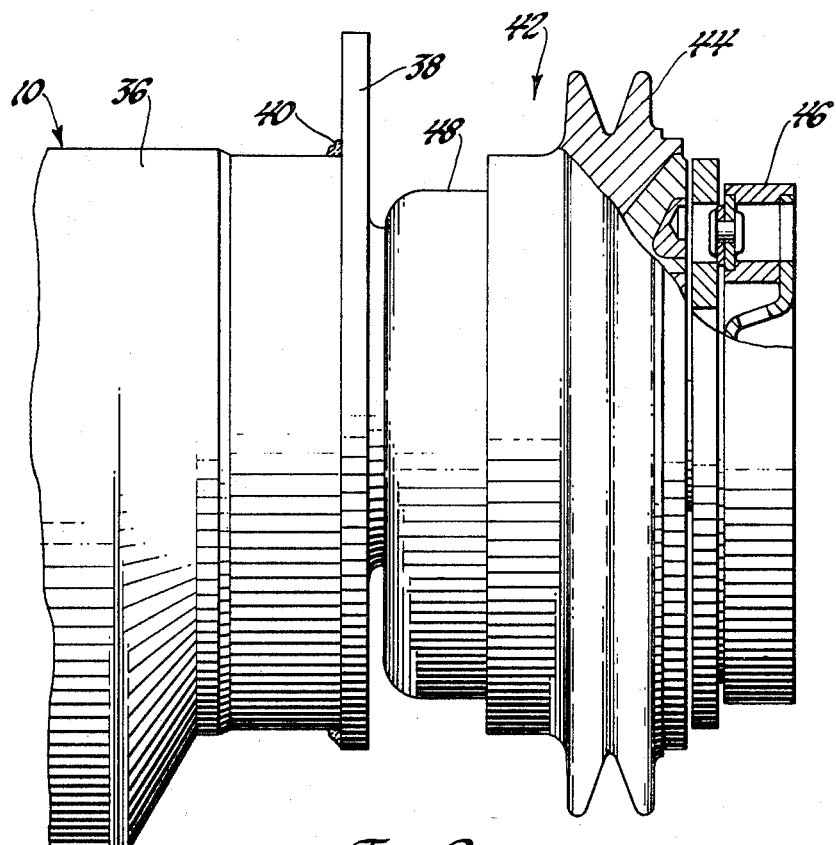
FIG. 2 is an enlarged view partially sectioned of the compressor's electromagnetic clutch shown in FIG. 1.

In FIG. 1 of the drawings, a refrigerant compressor 10 is illustrated. Compressor 10 is fluidly connected by conduit 12 to a condenser 14 adapted to be placed in front of the automobile radiator. The condenser 14 is fluidly connected by conduit 16 to an expansion valve 18. The expansion valve 18 controls the flow of refrigerant through a conduit 20 to an evaporator 22. From the evaporator 22, refrigerant is transmitted by a conduit 24 back to the compressor 10.

In compressor 10, refrigerant is pressurized and pumped to the condenser 14 where it is cooled and liquefied. The expansion valve 18 expands the high pressure liquid refrigerant to a lower pressure. The low pressure refrigerant evaporates within evaporator 22 as it absorbs heat from air flowing through the evaporator into the passenger compartment. An ambient air duct 26 conducts air from the exterior of the automobile into the passenger compartment. A recirculating air duct 28 draws air from the passenger compartment and passes it through the evaporator 22 back into the passenger compartment through a discharge duct 30. An air mix door 32 which is pivotal about the hinge 34 proportions the quantity of ambient air from duct 26 and recirculated air from duct 28 that will then flow through the evaporator 22. The air mix door 32 is selectively positioned by temperature controls within the passenger compartment to produce a desired air temperature within the passenger compartment.

The compressor 10 includes a housing 36 which encloses a swashplate type reciprocating piston compressor of the type presently used on automobiles manufactured by General Motors Corporation. Housing 36 is attached to an end member 38 by welding or brazing it at 40. The end member 38 supports the compressor and an electromagnetic clutch assembly 42 including a rotatable portion with an outer pulley sleeve 44 which is adapted to be driven by a belt connected to the crankshaft of the automobile engine. A portion 46 of the electromagnetic clutch 42 is attached to a shaft extending from the compressor and is adapted to engage the rotatable portion 44 of the clutch assembly 42 whenever an electromagnetic coil 48 is energized. Energization of coil 48 causes members 44, 46 to engage and for both to rotate together.

When the compressor 10 is operating, compressed liquid refrigerant flows in the expansion valve 18. The expansion valve 18 controls the flow of refrigerant into evaporator 22 through a port 50 between an inlet 16 and an outlet 20 of the expansion valve 18. Port 50 is opened and closed by a valve member 52 which is connected by rod 54 to a diaphragm follower member 56. Member 56 is supported within a sleeve member 58 which is staked at 60 to housing 62 of the expansion valve 18. A threaded end 64 of rod 54 is connected to member 56 and also secures a flexible seal member 66. The seal member 66 is biased against the sleeve 58 around its edge by a coil spring 68 and backup member 70.

Member 56 is attached to a flexible diaphragm 72 which forms a movable wall of a control chamber 74 in housing 62. The control chamber 74 is fluidly communicated by a passage 76 to the conduit 20 which is in communication with the evaporator inlet. The other side of the diaphragm 72 borders a reference pressure chamber 78 which is maintained at a constant pressure. A spring 80 biases a seat member 82 against diaphragm 72 which tends to move the valve 52 to a more open position. An adjustment screw means including plate 84 and a screw 86 within a threaded gromet 88 is provided to calibrate the expansion valve.

When the compressor is operative to cool the evaporator, expansion valve 18 controls the flow of refrigerant into the evaporator to maintain a constant fluid pressure in the evaporator. Passage 76 transmits the evaporator inlet pressure to the control chamber 74. When the pressure within the control chamber 74 decreases which corresponds to a low liquid level in the evaporator, the valve member 52 is moved downward toward a more open position to admit more liquid refrigerant into the evaporator. Conversely, when a greater evaporator pressure is transmitted to the control chamber 74, valve member 52 is moved toward a more closed position to reduce the quantity of liquid refrigerant in the evaporator.

Referring again to FIG. 1, a compressor 10 and magnetic clutch assembly 42 are illustrated with the coil of the clutch shown schematically and identified by the numeral 90. One side of the coil 90 is connected to ground by a conductor 92. The other side of the coil 90 is connected by conductor 94 to one terminal of an ambient temperature sensing switch 96. The conductor 94 also connects the coil 90 to a terminal of an air discharge switch 98 which responds to the air temperature downstream from evaporator 22. The other terminals are connected by a conductor 100 to a master off-on switch 102. Switch 102 is connected by a conductor 104 to a battery 106. The battery is grounded by a conductor 108.

Figures 3, 4:
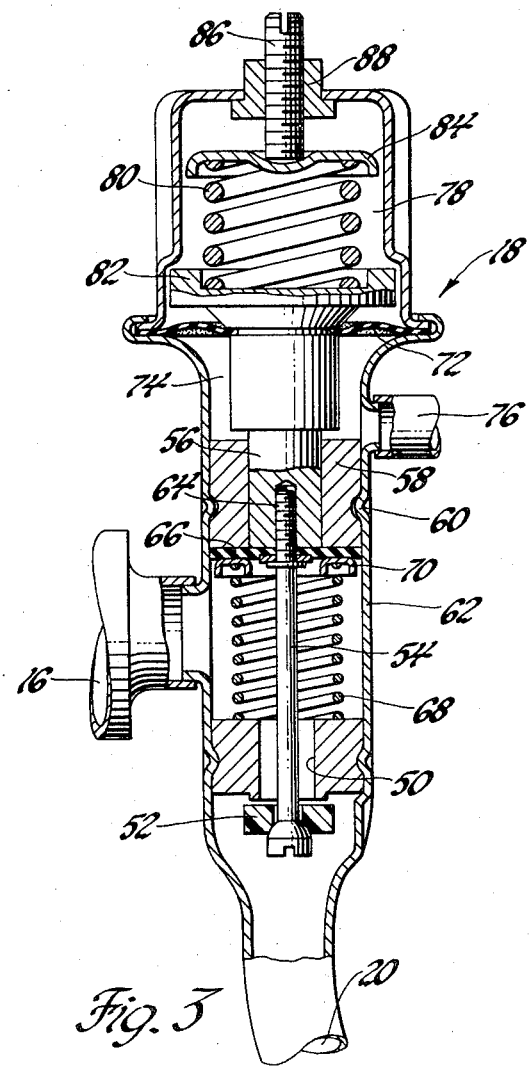
FIG. 3 is an enlarged sectioned view of the expansion valve shown in FIG. 1.
FIG. 4 is a chart setting forth the operation of the air conditioning system over a range of ambient air temperatures.

The air conditioning system operates continuously whenever the ambient air temperature is above about 65° F. As shown in FIG. 4, the ambient switch 96 closes at approximately 65° F. This energizes coil 90 of the clutch assembly 42 to operate the compressor 10. As long as the ambient temperature is above 65° F., the compressor 10 will be active while the automobile engine is running.

Below about 65° F., the ambient switch 96 is open. Energization of coil 90 is then controlled by the switch 98. Switch 98 closes when the air temperature in duct 30 exceeds about 32° F. and opens at temperatures below 32° F. When the ambient temperature is between 32° F. and 65° F., switch 98 will close to energize the clutch assembly 42 and to operate compressor 10. The compressor operates until the temperature of evaporator 22 causes the air temperature in the discharge duct 30 to drop below 32° F. Then, the switch 98 opens to de-energize the clutch assembly 42 and interrupt operation of compressor 10. After a period of compressor inactivity, air in discharge duct 30 will rise above 32° F. and again the switch 98 will close to energize the clutch assembly 42 and operate the compressor 10. The opening and closing of switch 98 in response to air temperature in duct 30 cycles the compressor 10 off and on and prevents evaporator temperature from falling much below 32° F. Therefore, frost will not accumulate upon evaporator 22 and block air flow through the evaporator.

When the ambient temperature falls below 32° F., the clutch assembly 42 cannot be energized and compressor 10 is inoperative. Both switches 96 and 98 are open under these conditions.

While the embodiment illustrated in the drawings and described above is a preferred embodiment, other embodiments might be adapted.

What is claimed is as follows:

1. An automobile air conditioning system with controls to prevent frost accumulation on the evaporator when operated at low ambient temperatures: refrigerating apparatus including a refrigerant compressor, a condenser, an expansion valve and an evaporator in series flow relation; duct means enclosing said evaporator for discharging air into an automobile passenger compartment; an ambient air duct connected to said duct means for conducting air from the exterior of the automobile to said evaporator; a recirculating air duct connected to said duct means for conducting air from the automobile passenger compartment to said evaporator; electromagnetic clutch means including a coil connected to said compressor for selectively rendering said compressor operative whenever said coil is energized; an ambient temperature sensing switch in said ambient air duct and connected in circuit with an electric power source and said coil for energizing said coil whenever ambient air temperature exceeds a predetermined quantity sufficient to operate said compressor continuously without frost accumulating on said evaporator; an air discharge temperature sensing switch in said air discharge duct and connected in circuit with said electric power source and said coil for energizing said coil whenever the air temperature exceeds a temperature corresponding to frost forming temperatures of said evaporator and de-energizing said coil when the air temperature falls below that temperature whereby the compressor is cycled on and off to prevent low frost forming temperatures of the evaporator; said ambient switch and said air discharge switch being connected between said power source and said coil independently of one another so that at ambient temperatures above said predetermined quantity, said ambient switch controls compressor operation and at ambient temperatures below said predetermined quantity, the air discharge switch controls compressor operation.

2. An automobile air conditioning system with controls to prevent frost accumulation on the evaporator when operated at low ambient temperatures: refrigerating apparatus including a refrigerant compressor, a condenser, an expansion valve and an evaporator in series flow relation; duct means enclosing said evaporator for discharging air into an automobile passenger compartment; an ambient air duct connected to said duct means for conducting air from the exterior of the automobile to said evaporator; a recirculating air duct connected to said duct means for conducting air from the automobile passenger compartment to said evaporator; electromagnetic clutch means including a coil connected to said compressor for selectively rendering said compressor operative whenever said coil is energized; an ambient temperature sensing switch in said ambient air duct and connected in circuit with an electric power source and said coil for energizing said coil whenever the air temperature exceeds about 65° F. corresponding to a temperature in which said compressor can be operated continuously without frost accumulating on said evaporator; an air discharge temperature sensing switch in said air discharge duct and connected in circuit with said electric power source and said coil for energizing said coil whenever the air temperature exceeds a predetermined temperature which may cause frost to accumulate on said evaporator and de-energizing said coil when the air temperature falls below said predetermined temperature whereby the compressor is cycled on and off to prevent low frost forming temperatures of the evaporator; said ambient switch and said air discharge switch being connected between said power source and said coil independently of one another so that at ambient temperatures above about 65° F., said ambient switch controls compressor operation and at ambient temperatures below about 65° F., the air discharge switch controls compressor operation.

3. An automobile air conditioning system with controls to prevent frost accumulation on the evaporator when operated at low ambient temperatures: refrigerating apparatus including a refrigerant compressor, a condenser, an expansion valve and an evaporator in series flow relation; duct means enclosing said evaporator for discharging air into an automobile passenger compartment; an ambient air duct connected to said duct means for conducting air from the exterior of the automobile to said evaporator; a recirculating air duct connected to said duct means for conducting air from the automobile passenger compartment to said evaporator; electromagnetic clutch means including a coil connected to said compressor for selectively rendering said compressor operative whenever said coil is energized; an ambient temperature sensing switch in said ambient air duct and connected in circuit with an electric power source and said coil for energizing said coil whenever the air temperature exceeds about 65° F. corresponding to a temperature in which said compressor can be operated continuously without frost accumulating on said evaporator; an air discharge temperature sensing switch in said air discharge duct and connected in circuit with said electric power source and said coil for energizing said coil whenever the air temperature exceeds about 32° F. and de-energizing said coil when the air temperature falls below about 32° F. whereby the compressor is cycled on and off to prevent low frost forming temperatures of the evaporator; said ambient switch and said air discharge switch being connected between said power source and said coil independently of one another so that at ambient temperatures above 65° F. said ambient switch controls compressor operation and at ambient temperatures below 65° F. and above 32° F. said air discharge switch controls compressor operation.

* * * * *